(12) United States Patent
Wang et al.

(10) Patent No.: US 12,381,452 B2
(45) Date of Patent: Aug. 5, 2025

(54) METHOD FOR FAULT PROCESSING OF HALL POSITION SENSOR IN BRUSHLESS DIRECT CURRENT MOTOR

(71) Applicant: CRM ICBG (WUXI) CO., LTD., Jiangsu (CN)

(72) Inventors: Sang Wang, Jiangsu (CN); Xudong Zhao, Jiangsu (CN); Zhengrui Zhang, Jiangsu (CN)

(73) Assignee: CRM ICBG (WUXI) Co., Ltd., Jiangsu (CN)

( * ) Notice: Subject to any disclaimer, the term of this patent is extended or adjusted under 35 U.S.C. 154(b) by 88 days.

(21) Appl. No.: 18/020,932

(22) PCT Filed: Jul. 2, 2021

(86) PCT No.: PCT/CN2021/104247
§ 371 (c)(1),
(2) Date: Feb. 11, 2023

(87) PCT Pub. No.: WO2022/142232
PCT Pub. Date: Jul. 7, 2022

(65) Prior Publication Data
US 2023/0327522 A1 Oct. 12, 2023

(30) Foreign Application Priority Data
Dec. 30, 2020 (CN) .......................... 202011609195.1

(51) Int. Cl.
H02K 11/215 (2016.01)
H02K 29/08 (2006.01)

(52) U.S. Cl.
CPC ........... H02K 11/215 (2016.01); H02K 29/08 (2013.01)

(58) Field of Classification Search
CPC ............................ H02K 11/215; H02K 29/08
USPC ....................................................... 310/68 B
See application file for complete search history.

(56) References Cited

U.S. PATENT DOCUMENTS

2020/0186060 A1 6/2020 Brannen et al.

FOREIGN PATENT DOCUMENTS

| CN | 103472263 A | | 12/2013 | |
|---|---|---|---|---|
| CN | 104167979 A | * | 11/2014 | |
| CN | 108322106 A | | 7/2018 | |
| CN | 109194206 A | * | 1/2019 | .............. H02P 23/14 |

(Continued)

Primary Examiner — Jose A Gonzalez Quinones
(74) Attorney, Agent, or Firm — Global IP Services; Tianhua Gu

(57) ABSTRACT

A method for fault processing of HALL position sensor in brushless direct current motor, comprising: step (1) detecting HALL signals by an edge detection, and recording the times of edge hopping; step (2) determining whether the absolute value of a difference between the rotor position change represented by HALL and an angle value calculated internally by MCU is within the preset error range; if so, updating the angle value to the angle representing the rotor position that is detected by HALL, otherwise, increasing the MCU internal angle value according to an angle increment previously calculated through a motor rotation speed; step (3) obtaining an acceptable range based on an original value of the previous angle increment. The present invention provides an internal degree to record angle, and the motor commutation is accomplished according to the degree angle value recorded by the internal degree.

10 Claims, 4 Drawing Sheets

(56) References Cited

FOREIGN PATENT DOCUMENTS

| | | | |
|---|---|---|---|
| CN | 109905058 | A | 6/2019 |
| CN | 111817616 | A | 10/2020 |
| EP | 3644495 | | 4/2020 |

\* cited by examiner

METHOD FOR FAULT PROCESSING OF HALL POSITION SENSOR IN BRUSHLESS DIRECT CURRENT MOTOR

CROSS REFERENCE TO RELATED PATENT APPLICATION

The present application is the US national stage of PCT/CN2021/104247 filed on 2021 Jul. 2, which claims the priority of the Chinese patent application No. 202011609195.1 filed on 2020 Dec. 30, which application is incorporated herein by reference.

FIELD OF TECHNOLOGY

The present invention relates to the field of motor control, particularly to the field of motor fault processing, and specifically to a method for fault processing of HALL position sensor in brushless direct current motor.

BACKGROUND

When a fault occurs to a HALL sensor, the HALL sensor will remain at a high-level state or a low-level state without changing with the rotor position. For BLDC motor (brushless direct current motor), single HALL fault will cause the commutation sector change from the original six state to four state, and double HALL faults will cause the commutation sector change from six state to two state.

In the conventional technology, the following methods are used to realize fault processing:
1. Employing a rotor position observer, comparing the observation result with the output of a HALL sensor, and using the difference between the above two to detect faults of the sensor. After the faults are detected, the output of the observer is used as a feedback of the rotor position to realize fault-tolerant control. This method is more complicated for square wave control and needs to introduce a hardware peripheral.
2. Establishing a time confidence interval from the last commutation to the next commutation according to a previous motor running speed. If it is found that the commutation time between the last commutation and the next commutation is not within the time confidence interval, then doubling the confidence interval. If the commutation time between the last commutation and the next commutation is not yet within the doubled time confidence interval, then the HALL is determined to be faulty. The commutation time is given according to the timer value of the HALL that is currently confirmed to have no fault.

SUMMARY

The present invention provides a method for fault processing of HALL position sensor in brushless direct current motor, which meets the requirements of accurate data, minor error, and wide application.

The method for fault processing of HALL position sensor in brushless direct current motor is as follows:

the method for fault processing of HALL position sensor in brushless direct current motor includes:

step (1) detecting HALL signals by an edge detection, and recording the times of edge hopping;

step (2) determining whether the absolute value of a difference between a rotor position change represented by HALL and an angle value calculated internally by MCU is within a preset error range; if so, updating the angle value to the angle representing the rotor position that is detected by HALL, otherwise, increasing the angle value according to an angle increment previously calculated through a motor rotation speed;

step (3) obtaining an acceptable range based on an original value of the previous angle increment.

In an embodiment, the step (1) includes the following steps:

step (1.1) detecting the order of the HALL signal changes, and prompting a fault occurs;

step (1.2) determining whether the edge hopping occurs; if the edge hopping occurs, recording the times of the edge hopping in each electrical cycle and continuing with step (1.3); otherwise, if no edge hopping occurs, indicating all three HALL have faults;

step (1.3) recording the times of the edge hopping of round_x+1 after each HALL going through a rising edge and a falling edge, where x represents A, B, and C phase respectively; subtracting round_x from the maximum value of round_a, round_B, and round_c of each edge hopping respectively, and if the result is greater than 1, indicating the HALL has faults; otherwise, indicating no fault occurs.

In an embodiment, the step (3) includes the following steps:

step (3.1) obtaining the acceptable range of the angle increment based on the original value of the previous angle increment and an error angle set by a register in a commutation hardware circuit;

step (3.2) determining whether a difference between the angle value calculated internally by MCU and the angle corresponding to HALL is within the acceptable range when the HALL edge hopping occurs; if so, the angle value is updated to the angle corresponding to HALL, otherwise, the angle value is not updated.

In an embodiment, the method further includes a step of commutation, specifically including the following step:

performing the commutation when the angle values calculated internally by MCU are 30°, 90°, 150°, 210°, 270°, or 330°.

In an embodiment, the motor includes an angle recorder to record angles, and a commutation of the motor is performed according to the value of the angle recorder.

In an embodiment, the motor includes an error register group including a plurality of error registers, where the outputs of the error registers are all connected to a plurality of AND-OR gates to correspond to different rotor position angles when a commutation occurs respectively.

The method for fault processing of HALL position sensor in brushless direct current motor in the present invention is a method based on hardware detection, in which the repetitive detection work can be completed by the hardware, and the timely commutation can be ensured for the motor control users. The present invention provides the internal degree to record the angle, and the motor commutation is accomplished according to the degree angle value recorded by the internal degree. Therefore, compared to the method with only a timer in which the motor rotor position can not be intuitively acquired due to the count at a high speed being different from that at a slow speed, the current position of the motor is clearly known through the method in the present invention. The present invention can guarantee the normal work of the motor no matter how many HALL have failed, and the present invention is based on the idea of first ensuring the commutation and then detecting the HALL fault.

DETAILED DESCRIPTION

Figure 1:
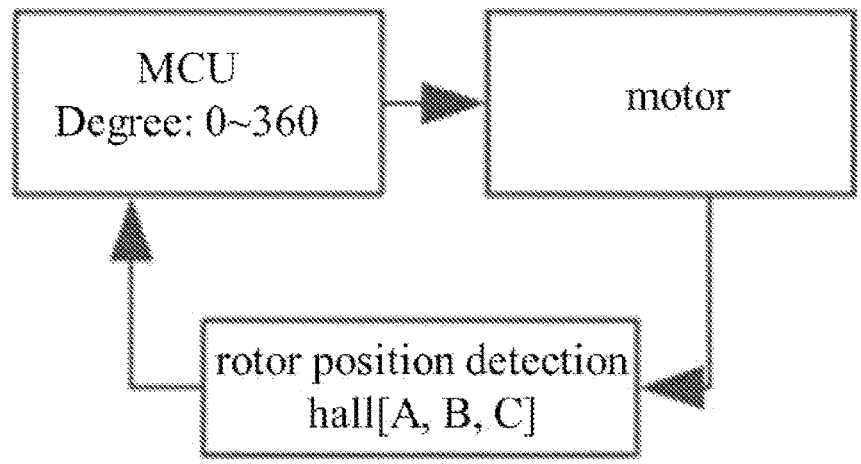
FIG. 1 shows a control block diagram of a motor according to a method for fault processing of HALL position sensor in brushless direct current motor in the present invention.

In order to describe the technical content of the present invention more clearly, the following is further described with reference to specific embodiments.

A method for fault processing of HALL position sensor in brushless direct current motor, including the following steps:

step (1) detecting HALL signals by an edge detection, and recording the times of edge hopping step (1.1) detecting the order of the HALL signal changes, and prompting a fault occurs;

step (1.2) determining whether the edge hopping occurs; if the edge hopping occurs, recording the times of the edge hopping in each electrical cycle and continuing with step (1.3); otherwise, if no edge hopping occurs, indicating all three HALL have faults;

step (1.3) recording the times of the edge hopping of round_x+1 after each HALL going through a rising edge and a falling edge, where x represents a, b, and c phase respectively; subtracting round_x from the maximum value of round_a, round_b and round_c of each edge hopping respectively, and if the result is greater than 1, indicating the HALL has faults; otherwise, indicating no fault occurs;

step (2) determining whether the absolute value of a difference between a rotor position change represented by HALL and an angle value calculated internally by MCU is within a preset error range; if so, updating the angle value to the angle representing the rotor position that is detected by HALL, otherwise, increasing the angle value according to an angle increment previously calculated through a motor rotation speed;

step (3) obtaining an acceptable range based on an original value of the previous angle increment;

step (3.1) obtaining the acceptable range of the angle increment based on the original value of the previous angle increment and an error angle set by a register in a commutation hardware circuit;

step (3.2) determining whether a difference between the angle value calculated internally by MCU and the angle corresponding to HALL is within the acceptable range when the HALL edge hopping occurs; if so, the angle value is updated to the angle corresponding to HALL, otherwise, the angle value is not updated.

In an embodiment, the method further includes a step of commutation, specifically including the following step:

performing the commutation when the angle values calculated internally by MCU are 30°, 90°, 150°, 210°, 270°, or 330°.

In an embodiment, the motor includes an angle recorder to record angles, and a commutation of the motor is performed according to the value of the angle recorder.

In an embodiment, the motor includes an error register group including a plurality of error registers, where the outputs of the error registers are all connected to a plurality of AND-OR gates to correspond to different rotor position angles when a commutation occurs respectively.

In a specific embodiment of the present invention, when a rotor position sensor (usually using HALL sensor) is faulty, a control system is required to be able to determine the sensor fault, and even when the fault occurs, a motor is required to not stop or lose control instantly but to maintain the normal operation. For some human-machine scenarios, such as electric vehicles, which have a high requirement for the high comfort of use, vibrating too much is not allowed, and being able to drive for a period of time and reusing after repairing are needed when the HALL fault occurs. Therefore, attention first should be paid to ensure the normal operation of the motor after the HALL fault occurs, and then to the detection of the fault. At the same time, it is also necessary to ensure the acceleration and deceleration of the motor when there is no fault occurrs to the motor, because the acceleration and deceleration of the motor are important factors in determining the fault of the HALL.

However, more attention is paid to fault detection in the currently conventional methods. In addition, a sudden occurrence of three HALL faults is not considered. Therefore, there are still hidden dangers. Although there are some methods using a non-sensing mode when a fault occurs to the HALL, these are only alternatives after the occurrence of the fault, because they cannot work when the fault suddenly occurs to the HALL.

The present invention includes a built-in angle counter, and the angle counter is used for detecting which specific HALL is faulty on the basis of ensuring the normal commutation.

The method of the present invention can realize: establishing the relationship between the next edge hopping and the previous edge hopping, determining there is truly a fault regarding a sudden occurrence of the edge hopping that are far apart, then putting forward an early warning, performing the commutation as usual according to the MCU internal angle value, and explaining the fault occurs to which HALL after the operation of two electrical cycles. For most practical applications, the fault occurs to which HALL is not important. As long as there is one fault occurs to a single HALL, the entire HALL board will be replaced. Therefore, the key lies in the normal operation of the motor after the fault occurs to the HALL. The present invention can also detect the faulty HALL in the case of merely replacing the faulty HALL.

Figure 2:
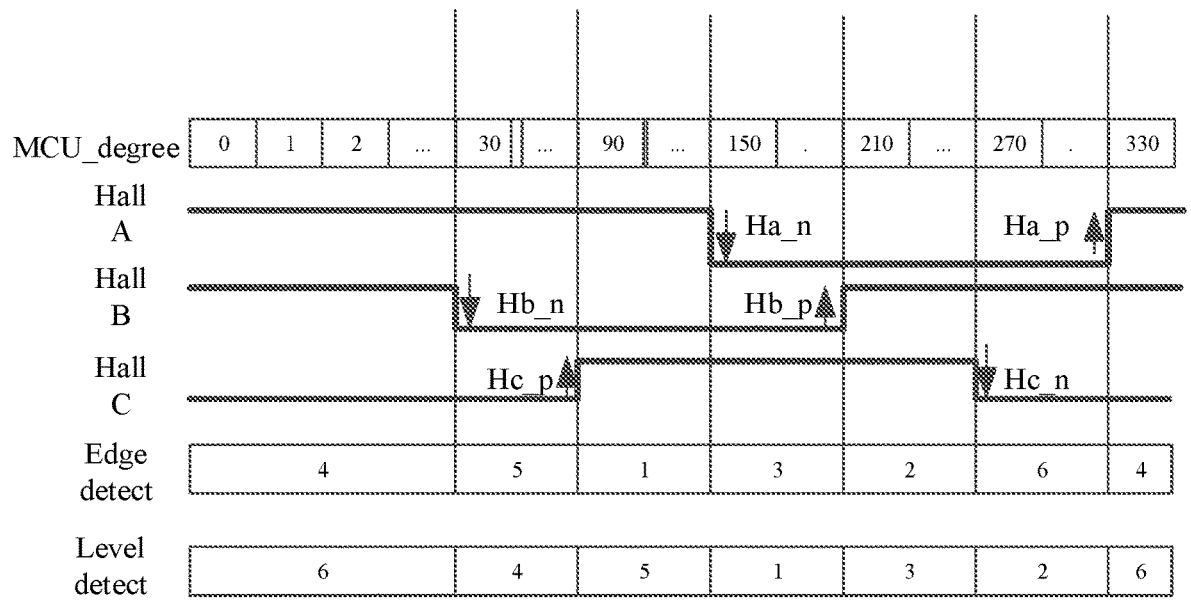
FIG. 2 shows a timing effect diagram of a motor operation according to the method for fault processing of HALL position sensor in brushless direct current motor in the present invention.
Figure 3:
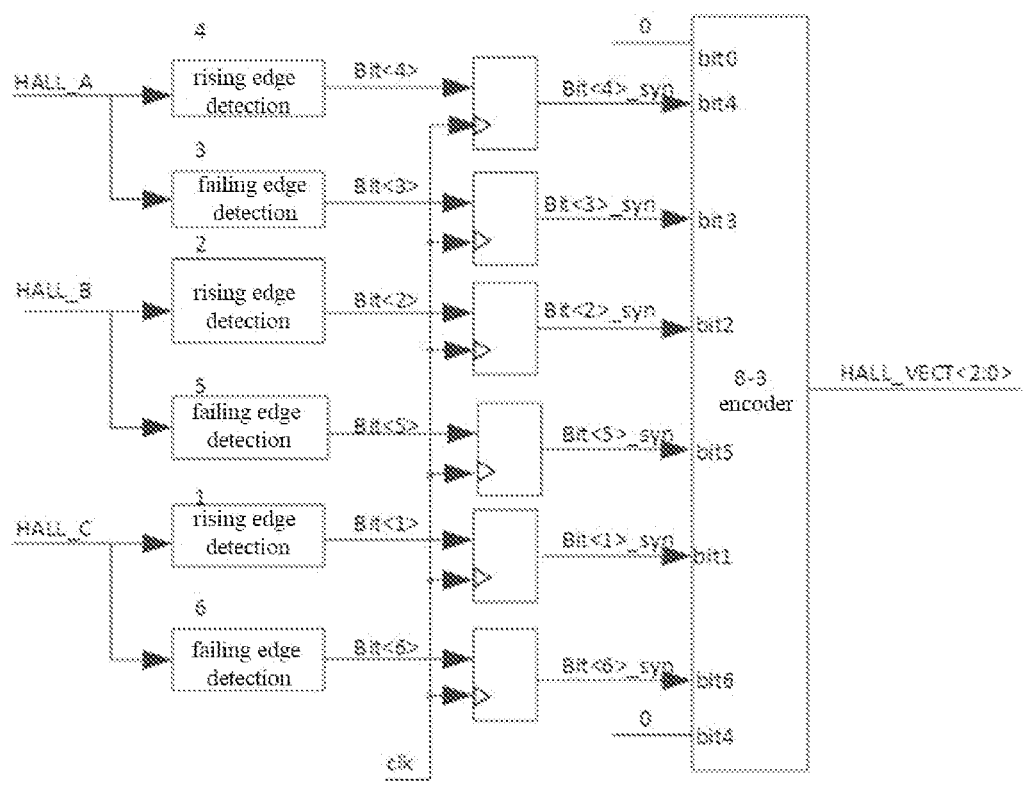
FIG. 3 shows a circuit diagram of a HALL edge detection according to the method for fault processing of HALL position sensor in brushless direct current motor in the present invention.
Figure 4:
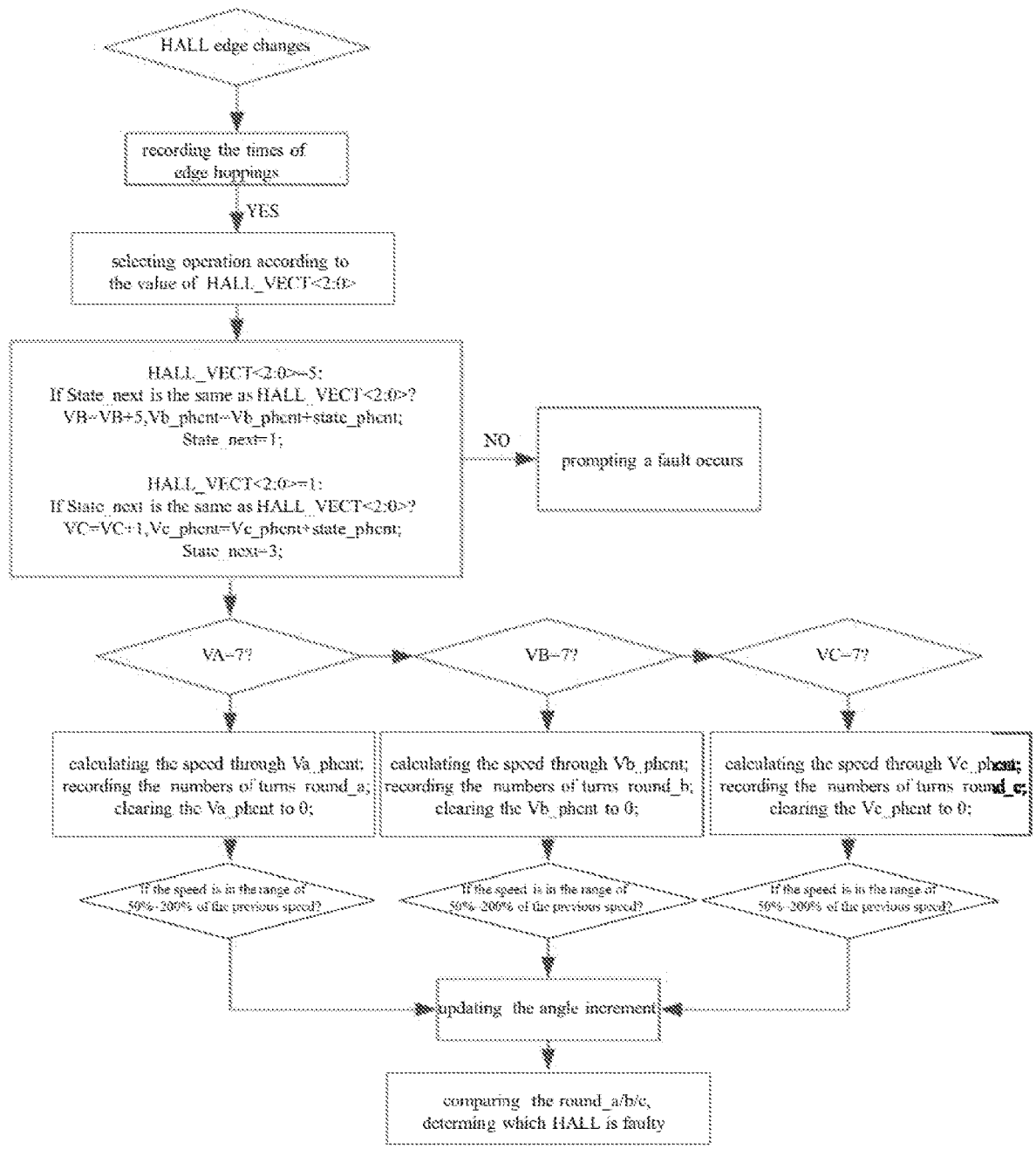
FIG. 4 shows a flow diagram of a HALL detection and a MCU internal degree count increment calculation according to the method for fault processing of HALL position sensor in brushless direct current motor in the present invention.
Figure 5:
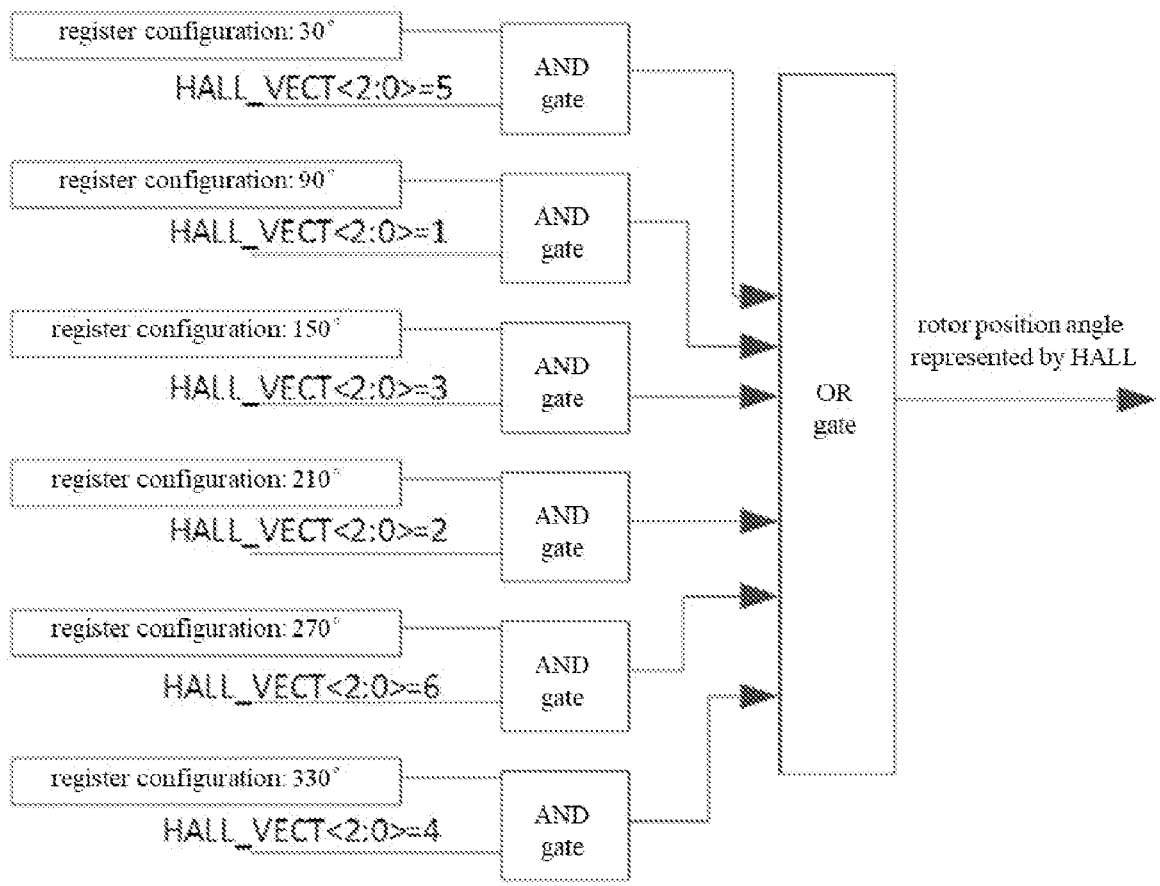
FIG. 5 shows a circuit diagram of converting the HALL edge detection results into rotor position angles according to the method for fault processing of HALL position sensor in brushless direct current motor in the present invention.

The block diagram of motor control and motor commutation is shown in FIG. 1, first, detecting HALL signals by the edge detection, where HALL<2> represents HALL_A, HALL<1> represents HALL_B, and HALL<0> represents HALL_C. Updating the current degree value after detecting the position change of the rotor represented by the HALL, the achieved effect is shown in FIG. 2 and the hardware diagram is shown in FIG. 3. Increasing the degree angle automatically when the rotor position represented by HALL is not detected, and adjusting the incremental steps of the degree angle according to the motor speed, then updating the speed every time when the independent HALL signal goes through a rising edge and a falling edge, and the implementation process is shown in FIG. 4.

A HALL fault detection method is as follows:
1. Presetting the forward and reverse rotation of the motor in advance, so whether the sequence of the rotor position in the motor is 546231 or 513264 is also determined in advance. The acceleration and deceleration are interference factors for identifying HALL fault. When the motor works at a constant speed, the HALL position and the degree are shown as FIG. 2.
2. Taking the rotor position at HALL<2:0>=0×5 as an example (edge detection result), the level detection result is 100, and the current angle degree is 30°-90° when there is no fault occurs to the motor. Under normal circumstances, the next edge occurrence result is HALL<2:0>=0×1. If it is not 1, it may be 3 or 2 or 4 or 6, and the latter four all indicate that HALL is faulty. At this time, the fault occurs to which HALL can be analyzed certainly. However, the analysis of fault needs to be processed under the conditions of single HALL fault or double HALL faults and the like, which is more complicated and not the most critical in the motor operation. Therefore, only a prompt is given when a problem of HALL signal change order is found.
3. Recording the times of edge hopping in each electrical cycle (equivalent to the degree angle recorded internally by MCU), and if there is no edge hopping, there are faults that occur to all three HALL.
4. Determining the HALL is in a normal state if round_x+1 (x represents a, b, and c phase respectively) is recorded after each HALL going through a rising edge and a falling edge. Selecting the maximum value of the round_a, the round_b, and the round_c every time there is an edge hopping, subtracting the round_x (x includes a, b, c) from the maximum value of the round_a, the round_b, and the round_c respectively, and if the result is greater than 1, indicating the HALL has faults. The above operation is simple.

The angle increment calculation process is as follows:

Whether the angle increment can be updated in time affects the error of the results of the angle calculated internally by MCU and the external HALL detection results. If the corresponded update is accomplished immediately whenever the HALL edge changes, a false update due to faults may occur. Therefore, an acceptable range should be given based on the original value of the previous degree increment, and the acceptable range is set according to the error angle of the register in the commutation hardware circuit. If the error is 20°, the acceptable increment range is from original increment*0.75 to 1.5*original increment.

Assuming that the acceptable range of the angle increment is 1.5 times of the original increment, and if the angle increment calculated according to the HALL edge hopping is 1.5 times of the original increment, indicating the acceleration or fault may occur. Within the acceptable range, the angle degree calculated internally by MCU under the condition of 1.5 times of the original increment reaches the commutation point 20° ahead of that under the condition of the original increment (when the HALL fault occurs instead of the acceleration). If there is no hopping occurs to the HALL when the angle degree has reached the commutation point (for example, 90°), then when a hopping occurs to the HALL, the angle degree would have reached 110° according to the original speed increment, and if the difference between the angle degree and the degree corresponding to the HALL is within 20° at this time, then the angle degree calculated internally by MCU can be updated to the degree corresponding to the HALL, otherwise, the angle degree cannot be updated. If the acceleration occurs, there necessarily will be a hopping occurs to the HALL before 110°. Meanwhile, the angle degree can also be updated to the angle corresponding to the HALL.

The commutation method is as follows:

performing commutation when the degree angles calculated internally by MCU are 30°, 90°, 150°, 210°, 270°, or 330°, which are also referred to as the commutation points. If the external HALL is out of phase, the internal degree will continue to count without affecting the commutation to ensure the normal operation of the motor and avoid sudden abnormal commutation.

Since the acceleration and the deceleration will cause errors between the rotor position detected by the HALL and the Degree calculated internally by MCU, the error register is provided in the present invention. According to the practical application configuration, the configuration range is within 0 to 60°, and the conventional application configuration is 20°. When the absolute value of the difference between the rotor position angle corresponding to the HALL and the Degree calculated internally by MCU is less than 20°, the Degree is updated to the HALL detection result, and vice versa.

Figure 6:
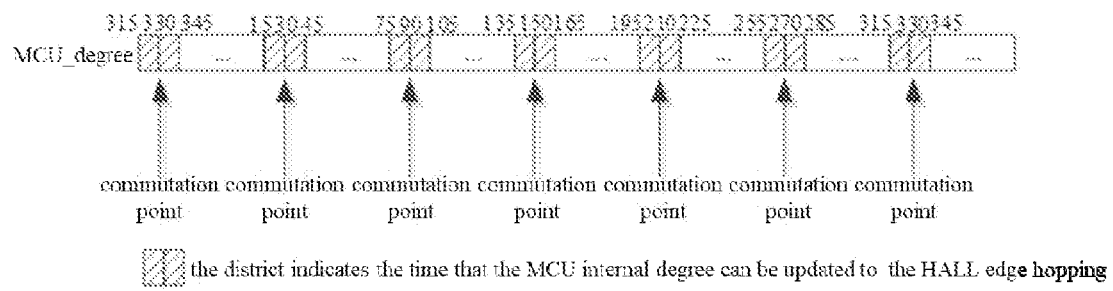
FIG. 6 shows a schematic diagram of the time of commutation and the time that the MCU internal degree is updated to a HALL hopping according to the method for fault processing of HALL position sensor in brushless direct current motor in the present invention.

The commutation point and the time that the MCU is updated to the HALL are shown in FIG. 6.

The method for determining in the present invention does not consider whether HALL has failed. The method first determines whether there is a HALL fault through the order which meets the 513264 or 546231 inevitability; secondly determines which HALL has failed by comparing the times of hopping of each HALL and selecting the HALL with more times of hopping, because the times of hopping of the faulty HALL will not increase. The commutation is also continuous and is not affected by the HALL fault.

The angle recorder is provided in the circuit to maintain the synchronization of the angle value and the HALL, thus realizing the commutation of the motor based on the value of the angle recorder and ensuring the normal work of the motor in the event of the three HALL faults.

The present invention determines whether update the angle value calculated internally by MCU to the HALL edge hopping value and controls the update of the angle increment, by comparing the difference between the angle value and the rotor position represented by the HALL edge hopping with the acceptable difference range preset by the register.

The method for fault processing of HALL position sensor in brushless direct current motor in the present invention is a method based on hardware detection, in which the repetitive detection work can be completed by the hardware, and the timely commutation can be ensured for the motor control users. The present invention provides the internal degree to record the angle, and the motor commutation is accomplished according to the degree angle value recorded by the internal degree. Therefore, compared to the method with only a timer in which the motor rotor position can not be intuitively acquired due to the count at a high speed being different from that at a slow speed, the current position of the motor is clearly known. The present invention can guarantee the normal work of the motor no matter how many HALL have failed, and the present invention is based on the idea of first ensuring the commutation and then detecting the HALL fault.

In this specification, the present invention has been described with reference to its specific embodiments. However, it is obvious that various modifications and changes can still be made without departing from the spirit and scope of the present invention. Therefore, the specification and drawings should be considered illustrative and not restrictive.

What is claimed is:

1. A method for fault processing of HALL position sensor in brushless direct current motor, comprising:
    step (1) detecting HALL signals by an edge detection, and recording the times of edge hopping, detecting the order of HALL signals, if the order of HALL signals changes, proceeding to step (2), otherwise, indicating no fault occurs;
    step (2) determining whether the absolute value of a difference between a rotor position change represented by HALL and an angle value calculated by MCU is within a preset error range; if so, indicating no fault occurs, updating the MCU internal angle value to the angle representing the rotor position that is detected by HALL, otherwise, indicating a fault occurs, without determining a type of Hall sensor fault, directly increasing the angle value calculated by MCU according to an angle increment previously calculated through a motor rotation speed;
    step (3) obtaining an acceptable range based on an original value of the previous angle increment.

2. The method for fault processing of HALL position sensor in brushless direct current motor according to claim 1, wherein the method further comprises the following after the step (3):
    step (4.1) determining whether the edge hopping occurs; if the edge hopping occurs, recording the times of the edge hopping in each electrical cycle and continuing with step (4.2); otherwise, if no edge hopping occurs, indicating all three HALL have faults;
    step (4.2) recording the times of the edge hopping of round_x+1 after each HALL going through a rising edge and a falling edge, where x represents a, b, and c phase respectively; subtracting round_x from the maximum value of round_a, round_b, and round_c of each edge hopping respectively, and if the result is greater than 1, indicating the HALL has faults; otherwise, indicating no fault occurs.

3. The method for fault processing of HALL position sensor in brushless direct current motor according to claim 1, wherein the step (3) comprises the following:
    step (3.1) providing the acceptable range of the angle increment based on the original value of the previous angle increment and an error angle set by a register in a commutation hardware circuit;
    step (3.2) determining whether a difference between the angle value calculated by MCU and the angle corresponding to HALL is within the acceptable range when the HALL edge hopping occurs; if so, the angle value calculated by MCU is updated to the angle corresponding to HALL, otherwise, the angle value calculated by MCU is not updated.

4. The method for fault processing of HALL position sensor in brushless direct current motor according to claim 1, wherein the method further comprises a step of commutation, comprising:
    performing the commutation when the angle values calculated internally by MCU are 30°, 90°, 150°, 210°, 270°, or 330°.

5. The method for fault processing of HALL position sensor in brushless direct current motor according to claim 1, wherein the motor comprises an angle recorder to record the angle, and a commutation of the motor is performed according to the value of the angle recorder.

6. The method for fault processing of HALL position sensor in brushless direct current motor according to claim 1, wherein the motor comprises an error register group comprising a plurality of error registers, wherein the outputs of the error registers are all connected to a plurality of AND-OR gates to correspond to different rotor position angles when a commutation occurs respectively.

7. The method for fault processing of HALL position sensor in brushless direct current motor according to claim 6, wherein the configuration range of the error registers is within 0 to 60°.

8. The method for fault processing of HALL position sensor in brushless direct current motor according to claim 7, wherein the configuration of the error registers is 20°.

9. The method for fault processing of HALL position sensor in brushless direct current motor according to claim 8, wherein if the absolute value of the difference between the rotor position change represented by HALL and the angle value calculated by MCU is within 20°, then the MCU internal angle value is updated to the angle representing the rotor position that is detected by HALL.

10. The method for fault processing of HALL position sensor in brushless direct current motor according to claim 8, wherein the acceptable range is from original value of the previous angle increment * 0.75 to 1.5 * original value of the previous angle increment.

* * * * *